US 7,895,187 B2

(12) United States Patent
Bowman (10) Patent No.: US 7,895,187 B2
(45) Date of Patent: Feb. 22, 2011

(54) HYBRID EVALUATION OF EXPRESSIONS IN DBMS

(75) Inventor: Ivan Thomas Bowman, Hammonds Plains (CA)

(73) Assignee: Sybase, Inc., Dublin, CA (US)

( * ) Notice: Subject to any disclaimer, the term of this patent is extended or adjusted under 35 U.S.C. 154(b) by 143 days.

(21) Appl. No.: 11/642,622

(22) Filed: Dec. 21, 2006

(65) Prior Publication Data

US 2008/0154818 A1 Jun. 26, 2008

(51) Int. Cl.
G06F 7/00 (2006.01)
G06F 17/30 (2006.01)

(52) U.S. Cl. ..................... 707/713
(58) Field of Classification Search ............ 707/2, 707/713
See application file for complete search history.

(56) References Cited

U.S. PATENT DOCUMENTS

| | | | | |
|---|---|---|---|---|
| 5,978,789 | A * | 11/1999 | Griffin et al. | 707/2 |
| 6,631,517 | B1 * | 10/2003 | Lamping et al. | 717/151 |
| 7,490,110 | B2 * | 2/2009 | Ewen et al. | |
| 2005/0097078 | A1 * | 5/2005 | Lohman et al. | 707/2 |
| 2006/0218123 | A1 * | 9/2006 | Chowdhuri et al. | 707/2 |

OTHER PUBLICATIONS

Jan-Willem Maessen, "Hybrid Eager and Lazy Evaluation for Efficient Compilation of Haskell", PhD Thesis, MIT, 2002.
Robert Jonathan Ennals, "Adaptive Evaluation of Non-Strict Programs", PhD Thesis, University of Cambridge, 2004.
Urban Boquist, "Code Optimization Techniques for Lazy Functional Languages" PhD thesis, Chalmers University of Technology, Apr. 1999.
Robert Ennals, "Optimistic Evaluation: An Adaptive Evaluation Strategy for Non Strict Programs", In proceedings of ICFP'03, Uppsala, Sweden, 2003.
Fokkink,W., Kamperman, J. and Walters, P. , "Lazy Rewriting on Eager Machinery", ACM Trans. Program. Lang. Syst. 22 1, pp. 45-86, Jan. 2000.
Sekar, R., Ramakrishnan I.V., and Mishra, P. "On the Power and Limitations of Strictness Analysis", ACM 44 3 , pp. 505-525, May 1997.
International Search Report for International Application No. PCT/US07/25828 mailed May 29, 2008.

* cited by examiner

Primary Examiner—Greta L Robinson
Assistant Examiner—Jeffrey Chang
(74) Attorney, Agent, or Firm—Sterne, Kessler, Goldstein & Fox P.L.L.C.

(57) ABSTRACT

A hybrid approach for evaluating expressions in database management systems is described herein. For each expression in an execution location (XL), an execution strategy is selected. The strategies considered are lazy, lazy with memoization, eager, and eager with memoization. The execution strategies are assigned in a way that minimizes the estimated cost of evaluation.

16 Claims, 12 Drawing Sheets

HYBRID EVALUATION OF EXPRESSIONS IN DBMS

BACKGROUND OF THE INVENTION

1. Field of the Invention

The present invention is directed to evaluating expressions in database management systems.

2. Background Art

Database management systems compute scalar expressions as part of their processing. There are two well-known argument evaluation approaches: lazy evaluation and eager evaluation. The lazy evaluation approach evaluates a scalar expression only when the value is needed. In contrast, eager evaluation evaluates all arguments before evaluating the expression that depends on them. Lazy evaluation avoids evaluating an expression if it is not needed, and can therefore be more efficient than eager evaluation. In contrast, eager evaluation evaluates a particular sub-expression only one time even if it is used multiple times within an expression graph. In this way, eager evaluation can alternatively evaluate a particular sub-expression fewer times than lazy evaluation would The wasted evaluations of lazy evaluation stem from re-evaluating a sub-expression when it already has the desired value (because it has already been evaluated with the current values of its arguments). Memoization is a well known technique that can be used to avoid wasted evaluations in this case. Lazy evaluation with memoization evaluates an argument only if the value is needed and only if the value is not currently available. This gives a minimal number of evaluations for the argument. Memoization can also be applied to eager evaluation; evaluations can be saved if the argument already has been computed with the needed value. Eager evaluation with memoization will evaluate more expressions than lazy evaluation with memoization in those cases where an argument that was speculatively evaluated turns out not to be needed.

From the preceding discussion, it might appear that lazy evaluation with memoization is uniformly the best approach. This is not true: lazy evaluation with memoization minimizes the number of expression evaluations, but it does so at the expense of memoization bookkeeping that may exceed the cost of the saved evaluations. No single approach (eager or lazy, with or without memoization) is optimal in all cases. Accordingly, there is a need for a hybrid approach to expression evaluation in database management systems.

BRIEF SUMMARY OF THE INVENTION

The present invention is directed to systems, methods and computer program products for expression evaluation in a database management system (DBMS).

Briefly stated, the invention uses a hybrid approach to evaluate expressions. In an embodiment, for each argument of each expression, an evaluation strategy is selected based on cost estimates. The argument can be evaluated eagerly or lazily. An additional decision is made whether to use memoization. A cost-based optimizer selects an evaluation strategy for each argument of each expression, and the evaluation strategies are implemented at execution time.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. DBMS Overview and Example Computer Implementation

The present invention is directed to systems, methods and computer program products for expression evaluation in a database management system.

Figure 1:
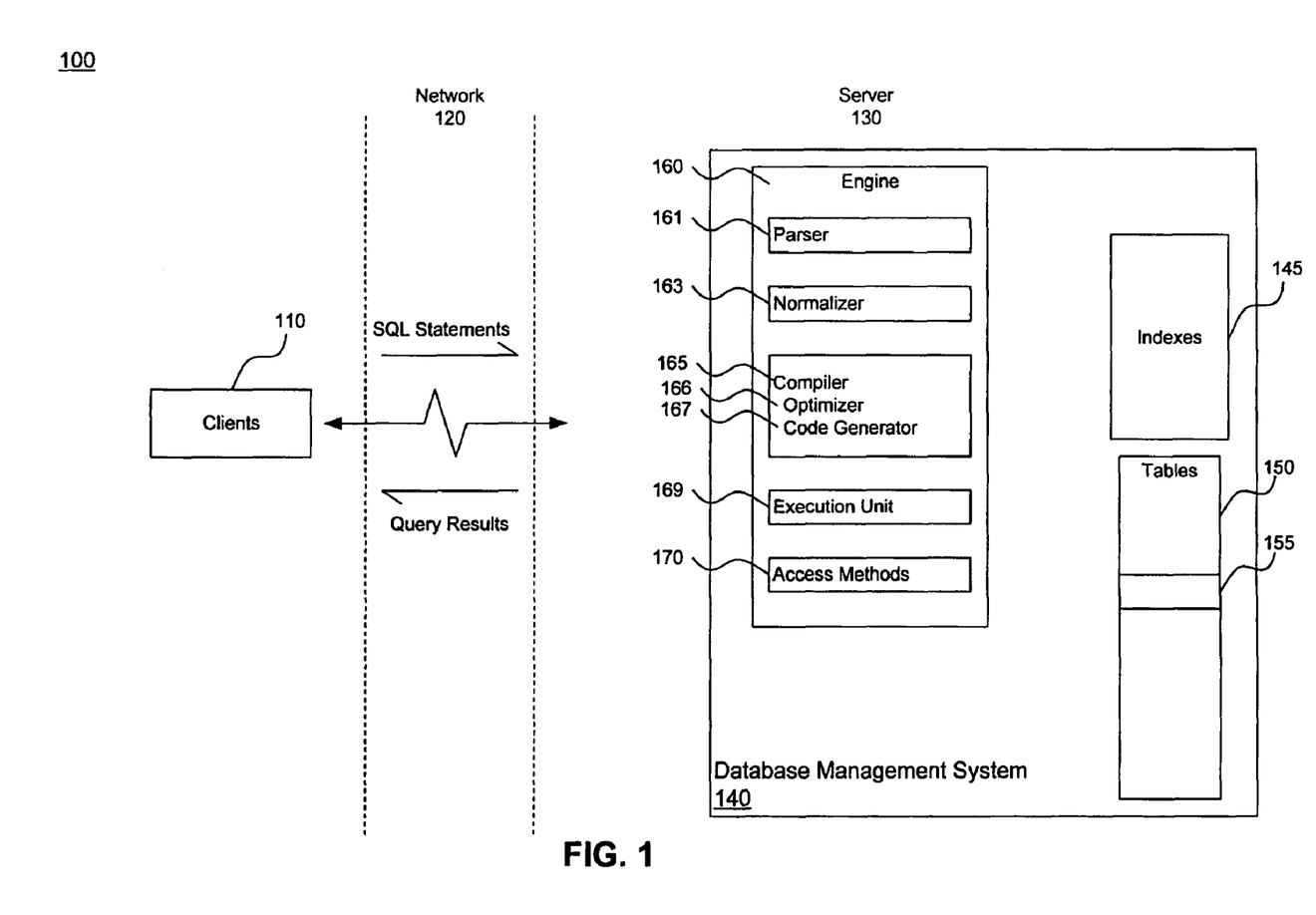
FIG. 1 illustrates a database management system according to an embodiment of the invention.

The invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. SQL statements received from clients 110 are processed by engine 160 of the DBMS 140. SQL is well known and is described in many publicly available documents, including "Information Technology—Database languages—SQL," published by the American National Standards Institute as American National Standard ANSI/ISO/IEC 9075: 1992, which is hereby incorporated by reference in its entirety.

The engine 160 comprises parser 161, normalizer 163, compiler 165, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 performs error checking, such as confirming that table names and column names which appear in the query are valid (e.g., are available and belong together). Finally, the normalizer 163 may also look up any referential integrity constraints which exist and add those to the query.

After normalization, the query tree is passed to the compiler 165, which includes an optimizer 166 and a code generator 167. The optimizer 166 is responsible for optimizing the query tree. The optimizer 166 performs a cost-based analysis for formulating a query execution plan. The optimizer 166 will, for instance, select the join order of tables, and select relevant indexes 145. The optimizer 166, therefore, performs an analysis of the query and determines the best execution plan, which in turn results in particular access methods 170 being invoked during query execution by the execution unit 169.

Figure 2:
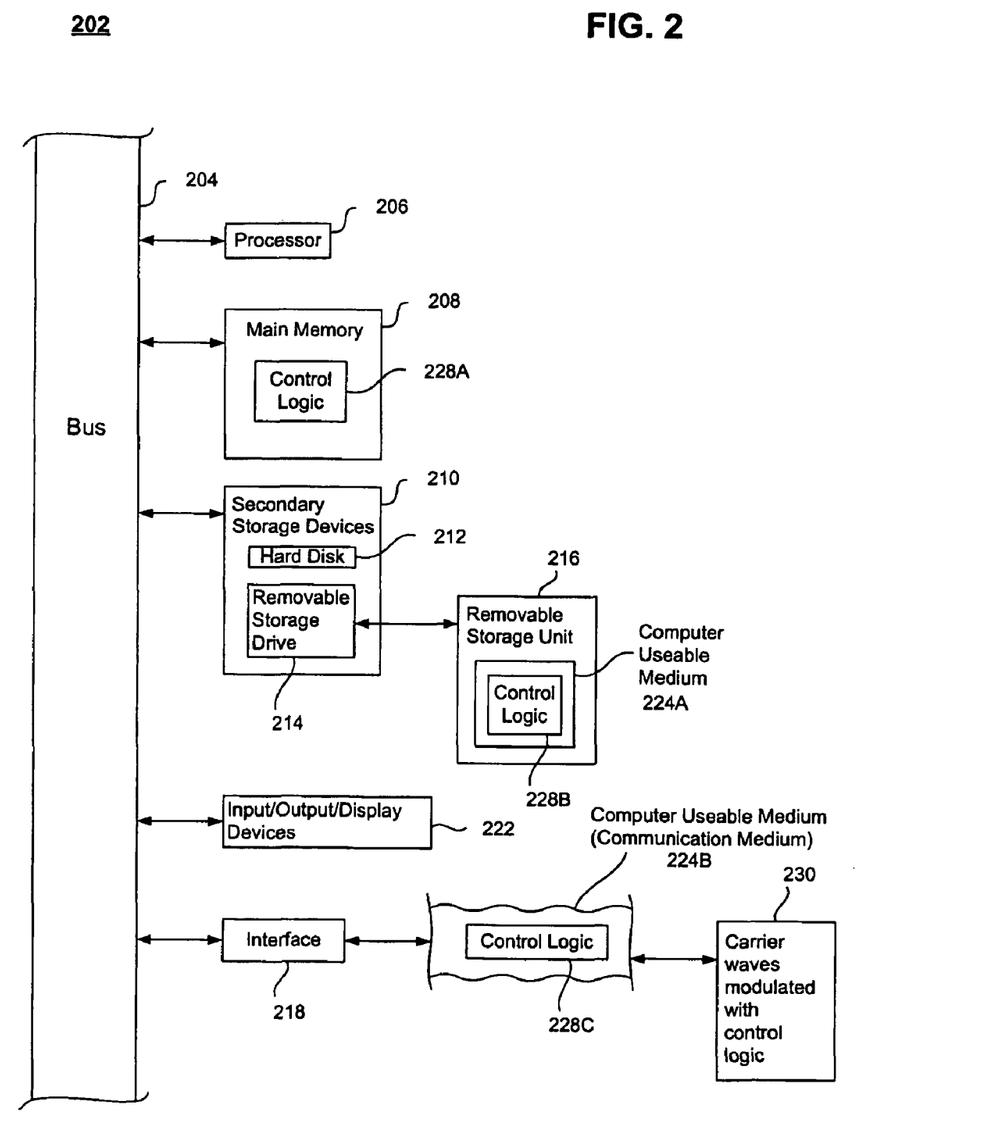
FIG. 2 illustrates an example computer system useful for implementing components of embodiments of the invention.

In an embodiment of the present invention, the system and components of the present invention described herein are implemented using well known computers, such as computer 202 shown in FIG. 2. For example, clients 110 and server 130 can be implemented using computers 202.

The computer 202 can be any commercially available and well known computer capable of performing the functions described herein, such as computers available from International Business Machines, Apple, Sun, HP, Dell, Compaq, Digital, Cray, etc.

The computer 202 includes one or more processors (also called central processing units, or CPUs), such as a processor 206. The processor 206 is connected to a communication bus 204.

The computer 202 also includes a main or primary memory 208, such as random access memory (RAM). The primary memory 208 has stored therein control logic 228A (computer software), and data.

The computer 202 also includes one or more secondary storage devices 210. The secondary storage devices 210 include, for example, a hard disk drive 212 and/or a removable storage device or drive 214, as well as other types of storage devices, such as memory cards and memory sticks. The removable storage drive 214 represents a floppy disk drive, a magnetic tape drive, a compact disk drive, an optical storage device, tape backup, DVD drive, etc.

The removable storage drive 214 interacts with a removable storage unit 216. The removable storage unit 216 includes a computer useable or readable storage medium 224A having stored therein computer software 228B (control logic) and/or data. Removable storage unit 216 represents a floppy disk, magnetic tape, compact disk, DVD, optical storage disk, or any other computer data storage device. The removable storage drive 214 reads from and/or writes to the removable storage unit 216 in a well known manner.

The computer 202 also includes input/output/display devices 222, such as monitors, keyboards, pointing devices, etc.

The computer 202 further includes a communication or network interface 218. The network interface 218 enables the computer 202 to communicate with remote devices. For example, the network interface 218 allows the computer 202 to communicate over networks or mediums 224B (representing a form of a computer useable or readable medium), such as LANs, WANs, the Internet, etc. The network interface 218 may interface with remote sites or networks via wired or wireless connections, networks and mediums.

Control logic 228C may be transmitted to and from the computer 202 via the communication medium 224B. More particularly, the computer 202 may receive and transmit carrier waves (electromagnetic signals) modulated with control logic 230 via the communication medium 224B.

Any apparatus or manufacture comprising a computer useable or readable medium having control logic (software) stored therein is referred to herein as a computer program product or program storage device. This includes, but is not limited to, the computer 202, the main memory 208, the secondary storage devices 210, the removable storage unit 216 and the carrier waves modulated with control logic 230. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

2. Hybrid Evaluation of Expressions

According to an embodiment, the invention evaluates expressions using a hybrid lazy/eager approach, which is preferably performed by the compiler 165 during a query execution plan (QEP) building phase (although this embodiment is mentioned solely for illustrative purposes, and is not limiting). According to an embodiment, the invention is directed to scalar expressions, examples of which are listed in Table 1.

TABLE 1

Examples of Scalar Expressions

Known Values: Constant literals, global variables, host variables.
Quantifier Expressions: These represent the current value of a column in a quantifier, for example a scan over a base table.
Operators: Arithmetic operators (+, −, *, /) combining expression arguments.
Logical Tests: Comparisons (<, <=, =, >=, >, <>), LIKE and other tests that operate on expression arguments and return a logical result.
Logical Conditions: Boolean predicates such as AND, OR, NOT that operate on expressions returning logical results.
Builtin Functions: Pre-defined functions such as ABS, SIN, LENGTH, and so on, which operate on expression arguments.
Control Structures: Conditional expressions can be expressed using IF and CASE expressions. These operate on logical or value based expressions, returning a value.
Subqueries: Subqueries are invoked by the expression evaluator to evaluated quantified predicates (ANY, ALL, EXISTS) or to provide a value (subselects); they use expression arguments as outer references, and return either a value or logical result.
User Defined Functions: These are functions of expression arguments that return an expression result. They are implemented in procedural languages and can contain loops and recursion, but this is executed outside of the expression evaluator of interest.

In an embodiment, scalar expressions are evaluated in a QEP within execution locations (XL). An execution location is a particular point in a query execution plan (QEP) where a set of expressions are needed by query execution operators. Each XL within a QEP evaluates a set of expressions. A specific example would be a filter operator that applies a search condition such as "x+1<3" or a projection operator that evaluates a SELECT list of three expressions "x+1, x+2, x+3". During the evaluation of a particular XL, the values of the leaf expressions do not change. Therefore, if an expression is used as an argument to two or more expressions in a single XL, it will have the same value in all locations during a particular invocation of the XL. Consider the example of FIG. 7. The expression 708 "y+1" is used as an argument to 706 and to 707. The value of the expression 708 will be the same in both locations during a particular evaluation of the XL. In subsequent invocations of the XL, the argument 709 may have changed (710 is constant, and can not change). If the argument 709 is the same as the previous invocation, the value of 708 will be the same.

The lazy and eager approaches to evaluating expressions are well known and described in many publicly available documents. To aid in understanding the invention, these approaches shall now be briefly described.

Figure 7:
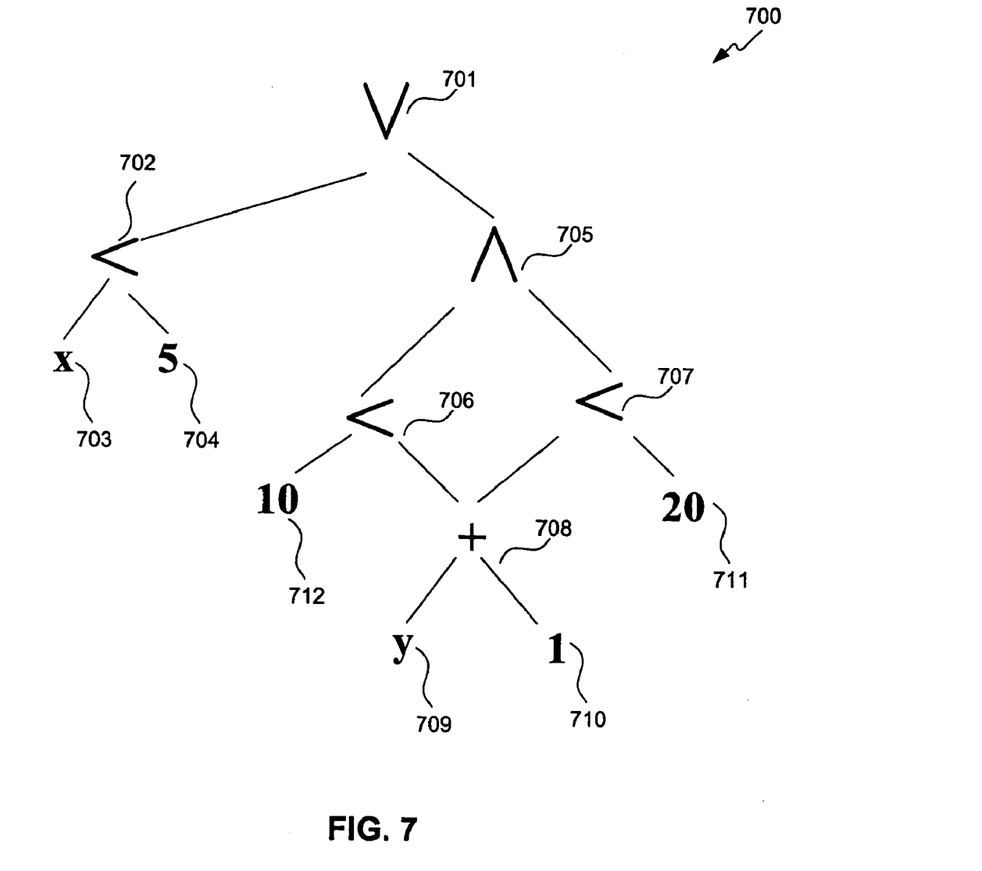
FIG. 7 is an example expression graph used to describe aspects of the invention.

With the lazy approach (also known as call-by-name), arguments are not evaluated until they are needed by their parent. When they are needed, they are evaluated every time they are used. Consider the example expression graph 700 in FIG. 7, representing the following expression: (x<5) OR (10< (y+1) AND (y+1)<20). During a particular evaluation of the XL referencing expression graph 700, it may be the case that the condition 702 is satisfied. With the call-by-name approach, such an invocation of the XL would result in only 702 and 701 being evaluated. If, alternatively, 702 did not hold (was not true), then evaluation would proceed to 705, 706, then 708. If condition 706 passed (was true), then execution would proceed to 707, then 708. In call-by-name, the expression 708 would be re-evaluated, even though its value had not changed since the previous evaluation (as leaf arguments do not change during a single invocation of an XL). This represents a wasted evaluation. As mentioned previously, memoization can be used with lazy evaluation (this modification is also known as call-by-need). With memoization, an expression is not re-evaluated if it has already been evaluated with the appropriate argument values. This memoization introduces bookkeeping overhead, but can avoid wasted evaluations.

Figure 3:
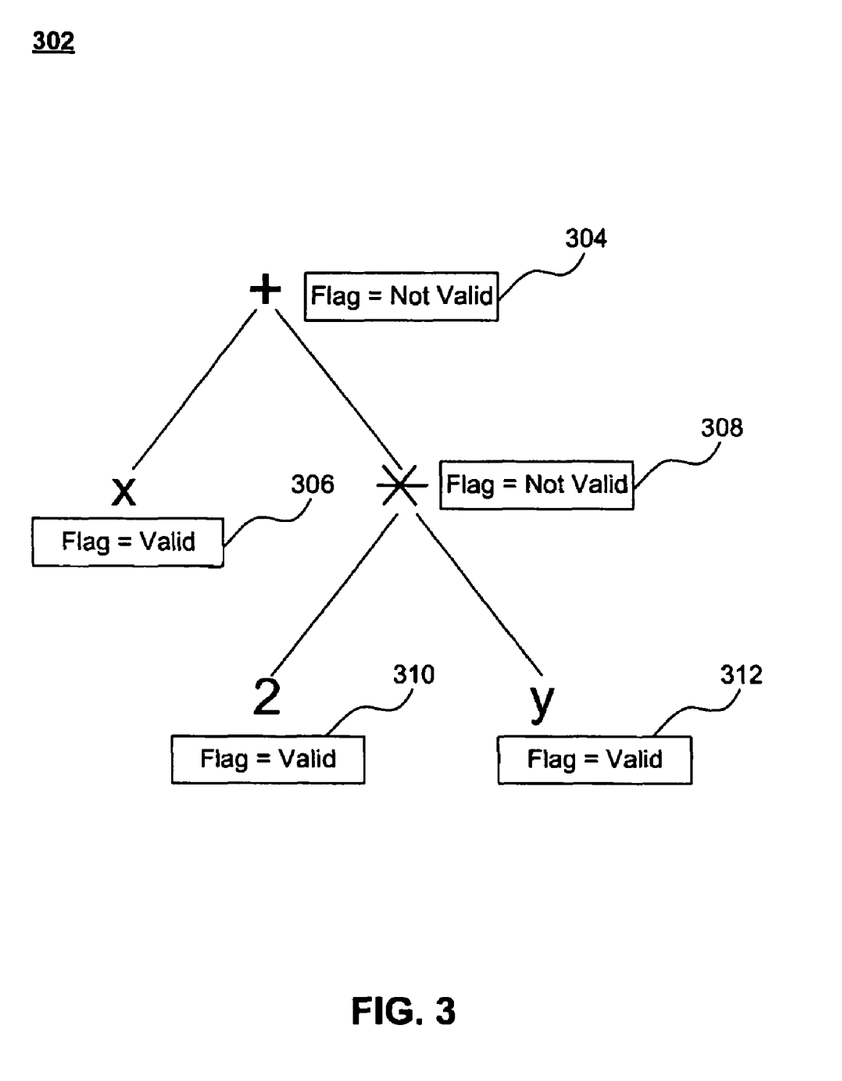
FIGS. 3-6 are example statement parse trees used to describe the lazy approach to evaluating expressions.
Figure 4:
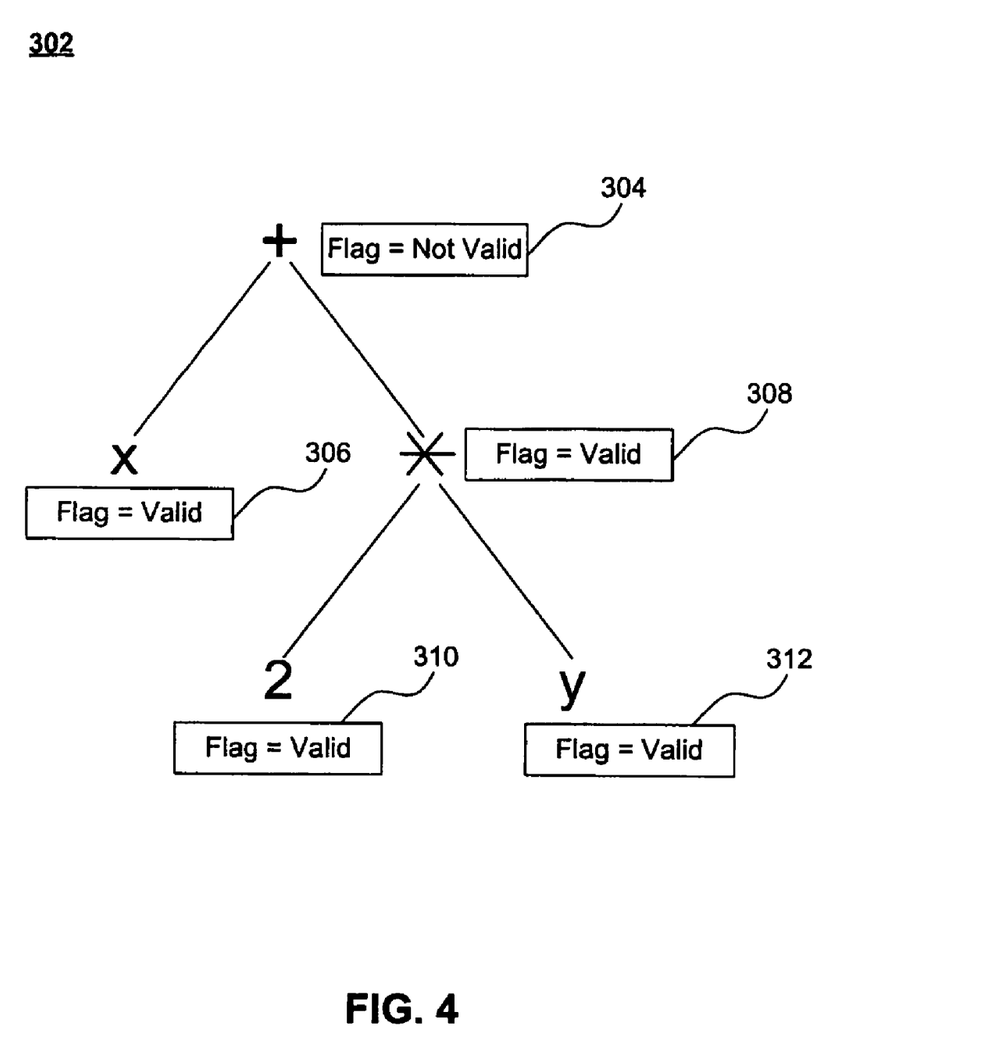
Figure 5:
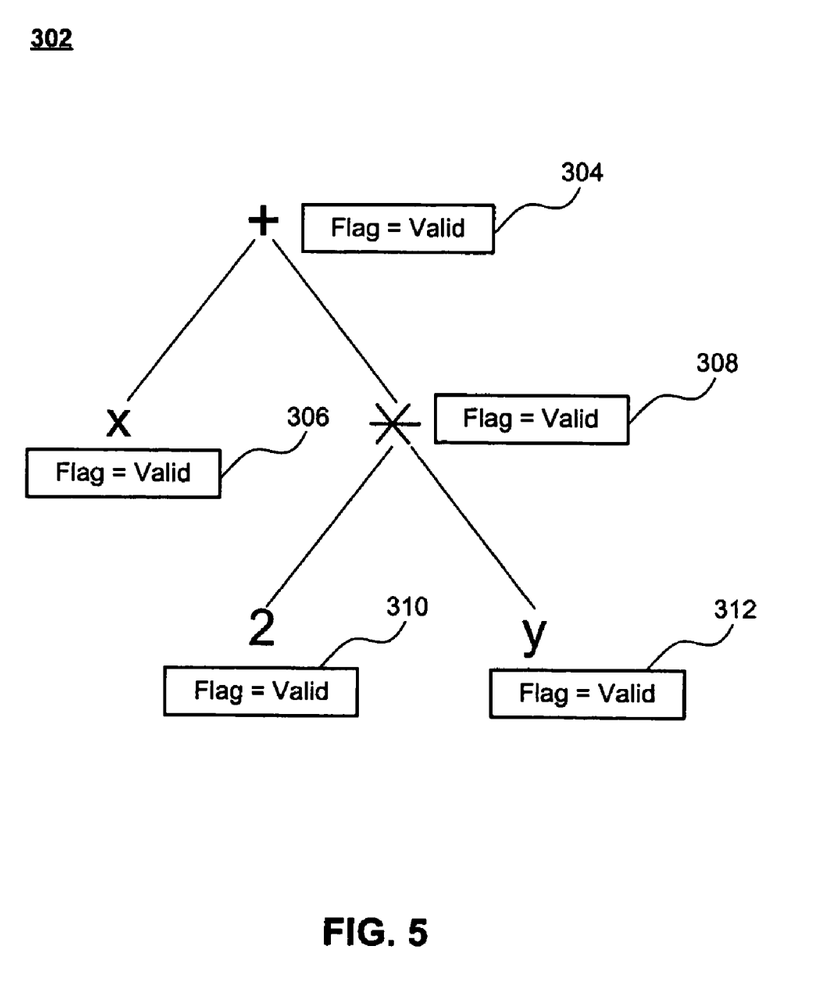

According to an embodiment, memoization can be implemented using flags indicating whether an expression is valid. This example is not restrictive, other implementations of memoization are possible. Consider the example statement parse tree 302 of FIG. 3, which represents the following expression: x+2*y With a flag-based implementation of memoization, flags 304, 306, 308, 310, 312 are maintained for each of the nodes. These flags 304, 306, 308, 310, 312 indicate whether the nodes have valid values. The expression is evaluated by starting at the root, or the "+" operator, and looking at the root's arguments as they are needed for evaluation of "+". If the nodes corresponding to the arguments are not valid, then work is performed to validate the node. In the example of FIG. 3, variable x is valid (since it was previously assigned a value), but the "*" operator is not yet valid (as indicated by its flag 308). Accordingly, the arguments of "*" are reviewed to determine if they are valid. In this case, the constant "2" is valid (as indicated by its flag 310), as is variable y (as indicated by its flag 312). Accordingly, the sub-expression 2*y is evaluated, which results in the flag 308 corresponding to the "*" operator being changed to "valid". This is shown in FIG. 4. Thereafter, all of the arguments of the "+" operator are valid, so the complete expression x+2*y is evaluated and the value of the corresponding flag 304 is changed to valid. This is shown in FIG. 5.

Figure 6:
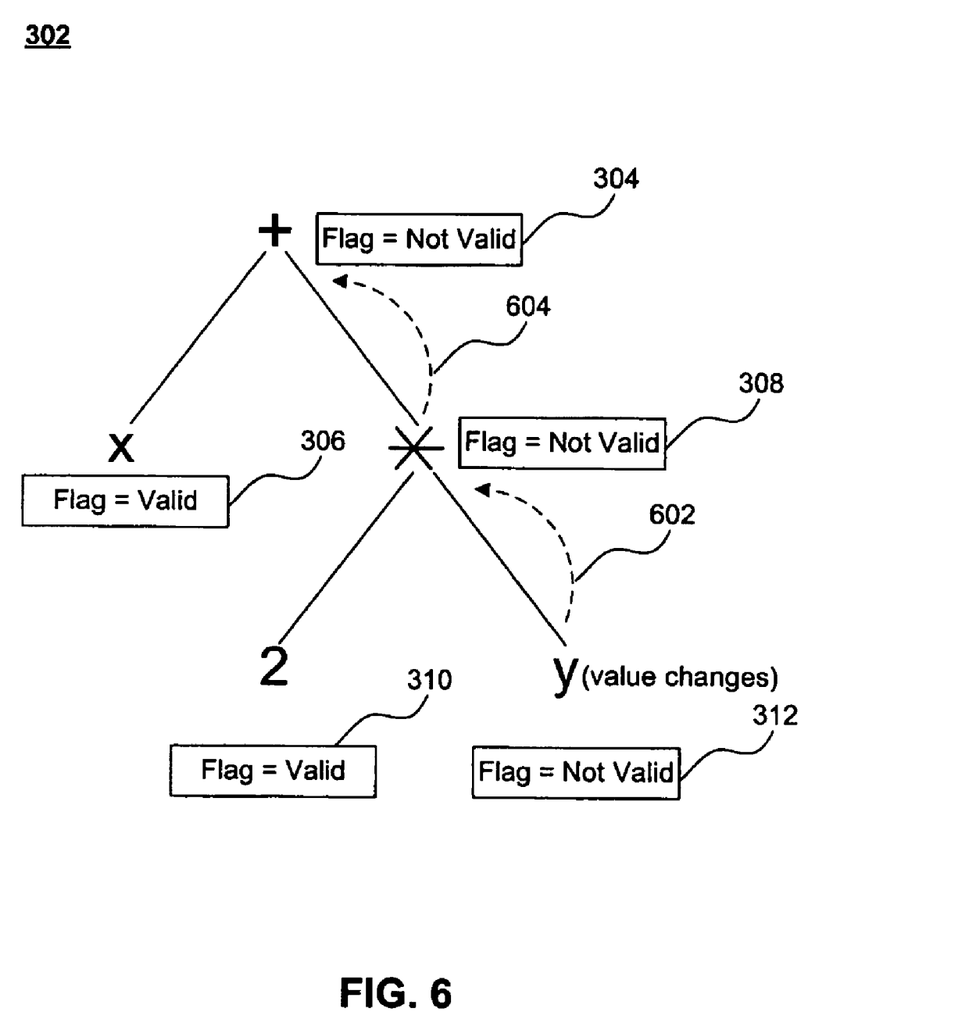

After the invocation of the XL containing the expression 304, further invocations of the XL will re-use the existing values of the expression 304. If a leaf expression changes, then bookkeeping effort is needed to update the memoization structure. Consider the example of FIG. 6, wherein variable y has been assigned a new value. With a flag-based implementation of the memoization needed for the call-by-need approach, back links 602 and 604 are maintained to ripple this change through the statement parse tree 302, and to change the flags 308, 304 corresponding to the "*" and "+" operators to "not valid".

The eager approach (also known as call-by-value) shall now be described. According to the eager approach, all arguments of an expression E are evaluated before evaluation of E begins, irrespective of whether their values are needed to compute the result of E. Thereafter the expression is evaluated. If static analysis can show that this evaluation must precede a later use of the argument within the same XL, the later use of the same argument within the same XL can be satisfied without re-computing the value or checking bookkeeping information. Consider again the example expression graph 700 of FIG. 7, representing the expression:

$$(x<5) \text{ OR } (10<(y+1) \text{ AND } (y+1)<20)$$

Assume that all of the arguments in 700 are to be evaluated eagerly. Evaluation proceeds in a depth-first order from left to right: 702, 708, 706, 707, 705, 701. All arguments are evaluated before their parent expression begins evaluating. Note that argument 708 is evaluated only one time for a particular invocation of the XL. After the first evaluation, it is statically known that the value of 708 is available for the remainder of the current invocation of this XL, and thus 708 is not re-computed when evaluating 707.

Note that OR returns "true" if either 702 or 705 is true. In other words, OR can be sometimes evaluated by evaluting a subset of its arguments. In such cases, the eager approach is inefficient because it requires evaluation of all arguments, whether or not they are needed to evaluate the expression.

The lazy approach is more efficient in this regard. Since it only evaluates arguments as they are needed, it would not require evaluation of all expression arguments if it was possible to evaluate the expression using a subset of the arguments (in the example of FIG. 7, 705 would not be evaluated if 702 (x<5) returned true). As noted above, however, the lazy approach is also inefficient. Without memoization (call-by-name) the lazy approach evaluates 708 twice if 702 and 706 are true. Alternatively, if memoization is used (call-by-need) then additional administrative overhead is needed for the memoization implementation.

Memoization can also be applied to the eager strategy. In contrast to memoization with the lazy strategy, the memoization cache is only inspected once in the eager approach; for later uses of the argument, the value is read directly with the knowledge that the eager evaluation has ensured the appropriate value has been computed for the invocation of the XL. The memoization savings for the eager evaluation result only from avoiding re-evaluating an argument on subsequent invocations of an XL. In the lazy strategy, savings are also achieved by avoiding multiple evaluations in a single invocation of the XL.

The present invention is a hybrid of the lazy and eager approaches, and accordingly overcomes their inefficiencies. The hybrid approach according to an embodiment of the invention shall now be described with reference to flowchart 802 in FIG. 8. Flowchart 802 is performed for each expression and sub-expression.

Figure 8:
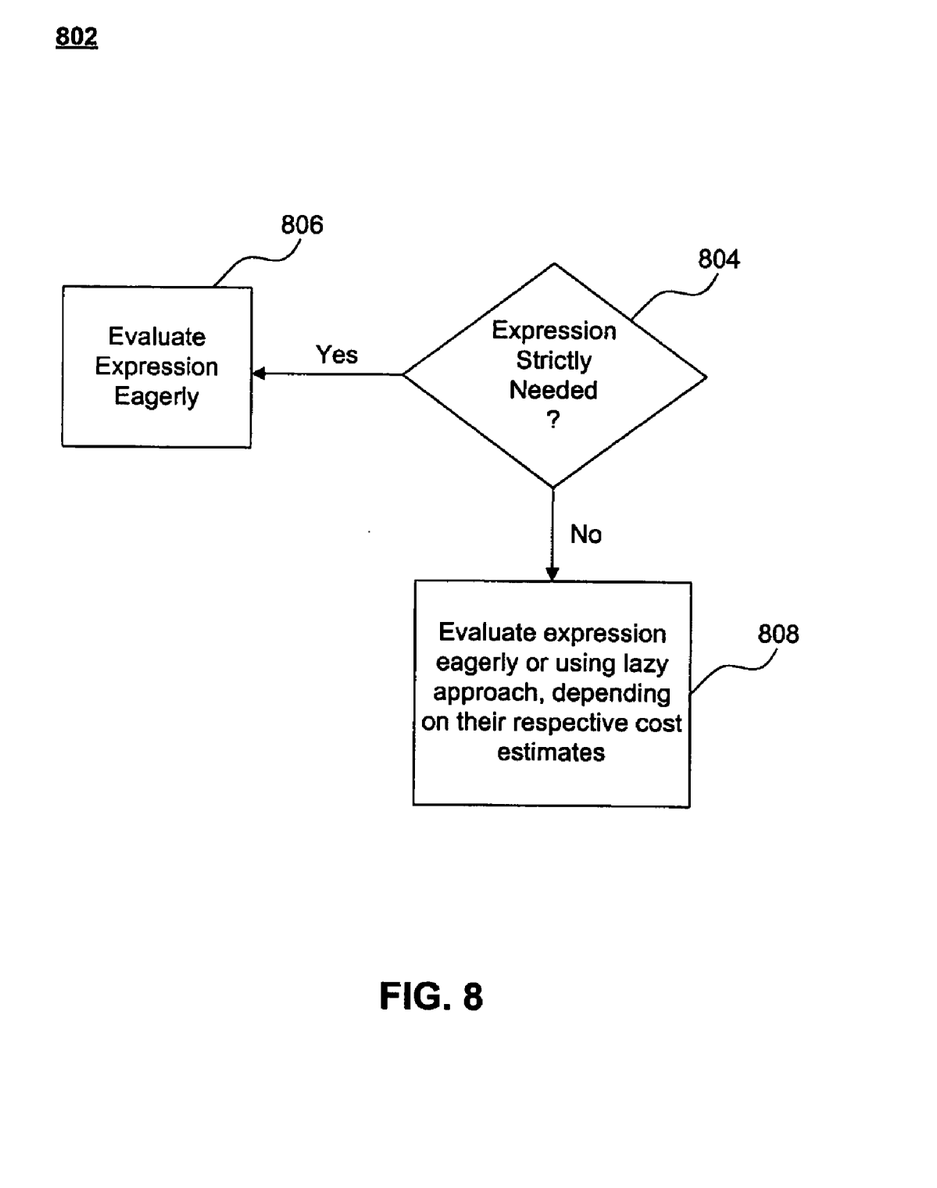
FIG. 8 is a flowchart of a hybrid expression evaluation method according to an embodiment of the invention.

In step 804, it is determined whether the expression being processed is a "strict expression." Strictness analysis is a well known-technique for determining which arguments are strictly needed by an expression tree. An expression is strict if all of its arguments must be evaluated before the expression itself can be evaluated. Otherwise, if some argument evaluation may be deferred or avoided, the function is called a non-strict function. For example, multiplication is a strict function. Logical constructs (AND, OR, etc.) and conditionals are usually non-strict. Even if an expression is non-strict, one or more of its arguments may be strict. For example, the IF expression always evaluates the predicate argument. Logical constructs must also evaluate at least one argument. Operation of step 804 according to an embodiment of the invention shall now be further described with reference to FIG. 9.

Figure 9:
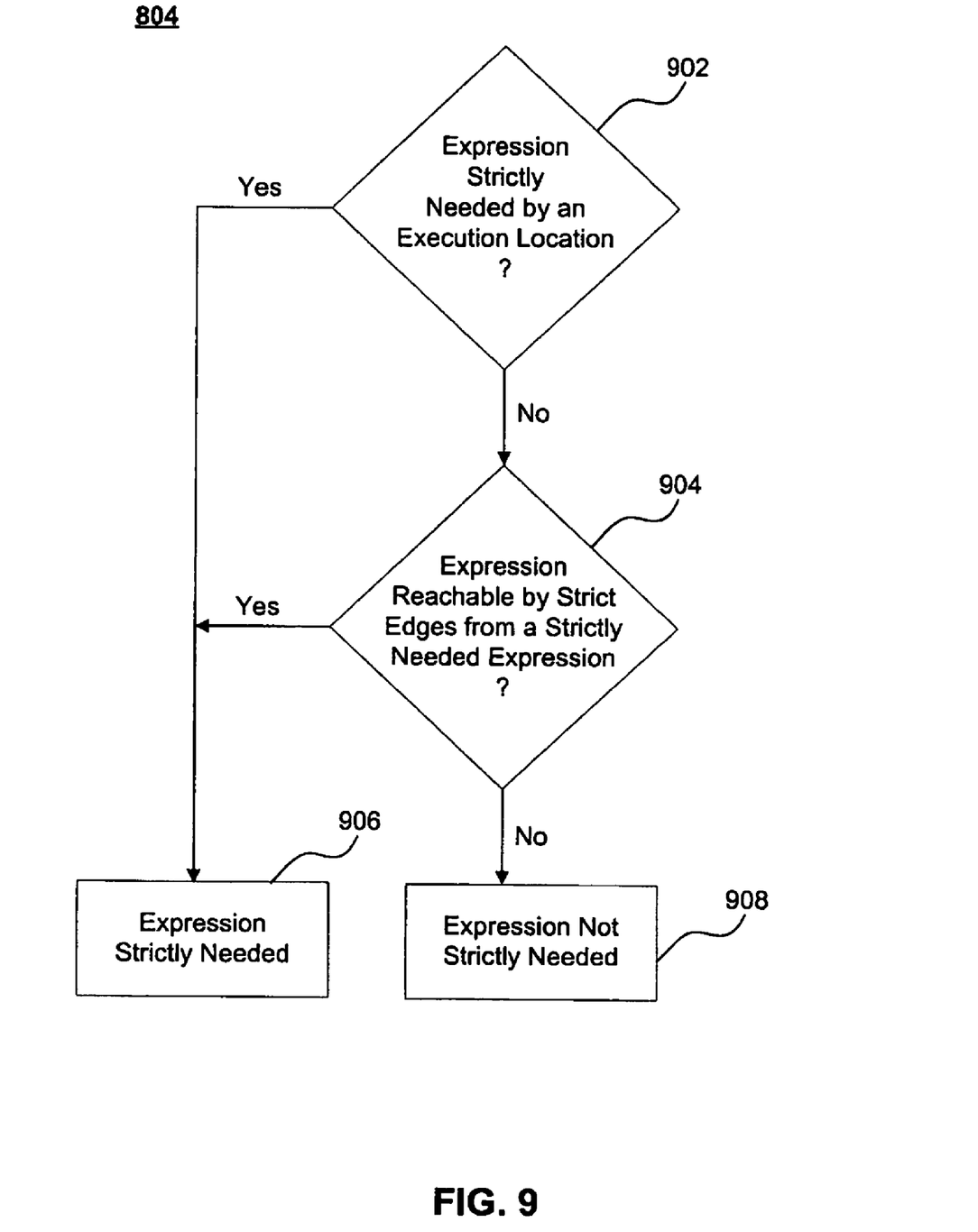
FIG. 9 is a flowchart illustrating a method of determining whether an expression is or is not strictly needed, according to an embodiment of the invention.

In step 902, it is determined whether the expression is in the set of expressions evaluated by an execution location XL. In step 904, it is determined whether the expression is reachable by strict edges from a strictly needed expression. If either steps 902 or 904 is true, then it is determined that the expression is strictly needed in the XL (as indicated by step 906), in which case step 804 returns true. If both steps 902 and 904 are false, it is determined that the expression is not strictly needed (as indicated by step 908), in which case step 804 returns false.

Figure 10:
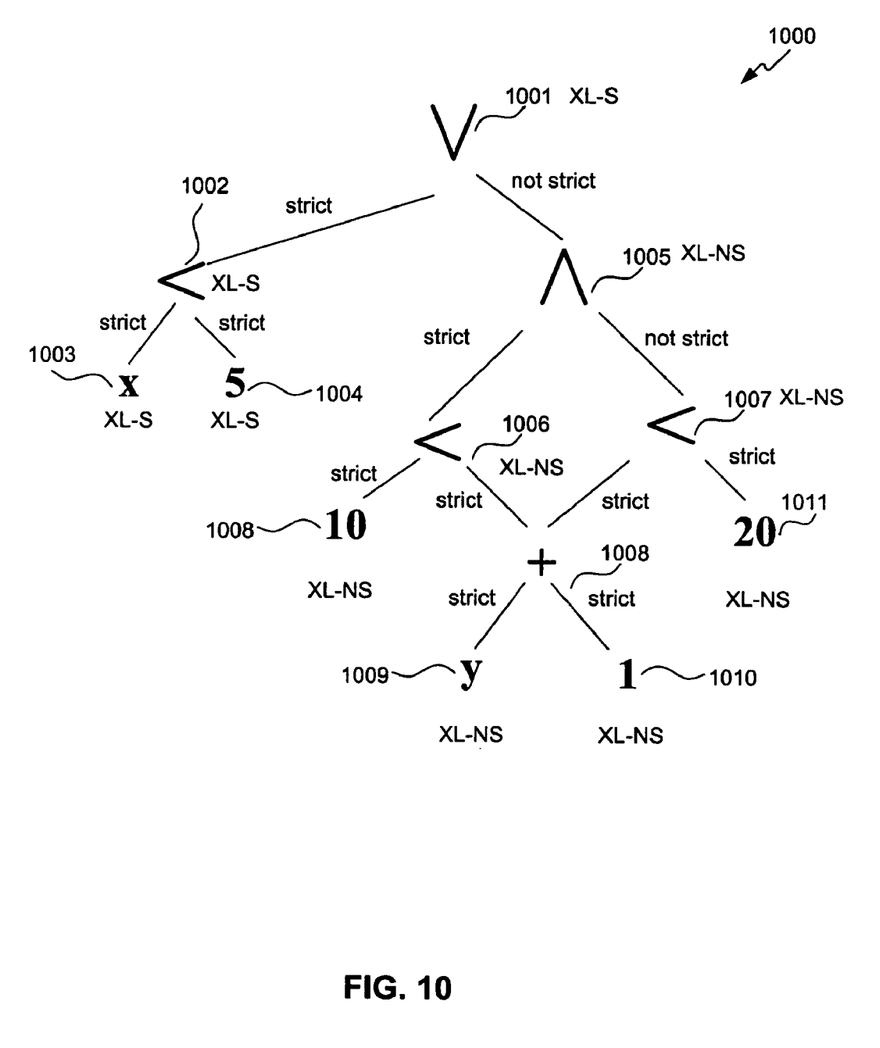
FIG. 10 is an example expression graph used to describe aspects of the invention.

See, for example, the example expression graph 1000 of FIG. 10, which represents the expression: (x<5) OR (10<(y+1) AND (y+1)<20). Consider first evaluation of the sub-expression 1002 (x<5). With regard to evaluation of the "<" function, step 902 would return true because a) 1001 is computed by the XL and b) the less than "<" function 1002 is reached by strict edges from 1001 "V". In contrast, 1005 is not strictly needed because it is not reachable from any expression computed by the XL following only strict edges.

We now define what it means for an argument to strictly precede another. If expressions E1 and E2 have a common ancestor EP, and E1 is reachable from EP along strict edges, and E2 is reachable from edges that are in a path that is evaluated after the strict path from EP to E1, then E1 strictly precedes E2. If a single expression strictly precedes itself and an eager evaluation strategy is used for the first evaluation, then subsequent uses of the expression can be satisfied directly without either evaluating the expression or checking a memoization cache. For example, in FIG. 7, expression 708 strictly precedes itself because there is a common ancestor 705 with a strict path to 708 (705, 706, 708) and a subsequent path (705, 707, 708) to the same argument. If 708 is evaluated with an eager strategy in the 706 context, then the 707 expression can re-use the already computed value without any run-time overhead.

Figure 12:
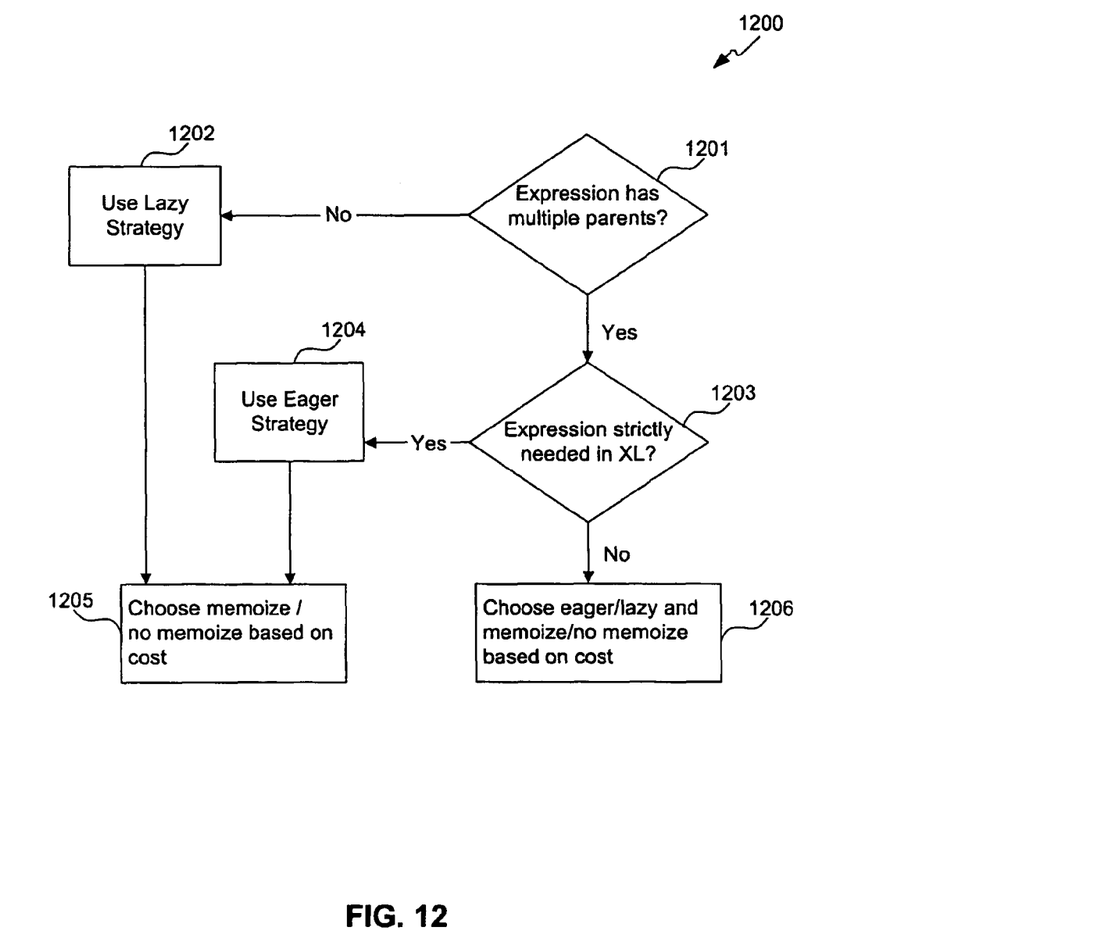
FIG. 12 is a flowchart of a hybrid evaluation optimizer according to an embodiment of the invention.

We now present an example embodiment of the hybrid evaluation optimizer as shown in FIG. 12.

In step 1201, for each expression, the method determines the number of parents. If the expression has a single parent, then it will be evaluated using a lazy evaluation strategy (step 1202). These expressions will be evaluated at most one time in the XL (single parent), so a lazy approach gives the best cost.

If the expression has multiple parents as determined in step 1201, then a strictness analysis is performed in step 1203. For those expressions that have multiple parents that are strictly needed by the execution location, an eager evaluation strategy is used (1204). These expressions will be needed at least one time in XL, so the eager strategy gives the best performance.

For the expressions that have been assigned an evaluation strategy in step 1202 or 1204, the method decides whether to use memoization based on cost (step 1205).

Returning to step 1203, for those expressions that have multiple parents that are not strictly needed by the execution location, step 1206 is performed. Note that there may be invocations of the XL that do not need the values of these expressions at all, so an eager strategy is not necessarily the best. Alternatively, as there are multiple uses within the XL, it may be more expensive to use a lazy strategy that will need to either evaluate the expression multiple times or at least check a memoization structure multiple times. According, in step 1206 (which typically but not always applies to a small subset of the expressions in the XL), a cost-based optimizer considers the cost of evaluating each argument with each of the four strategies (lazy, lazy memoization, eager, eager memoization). The assignment of strategies that minimizes expected cost is selected.

Figure 11:
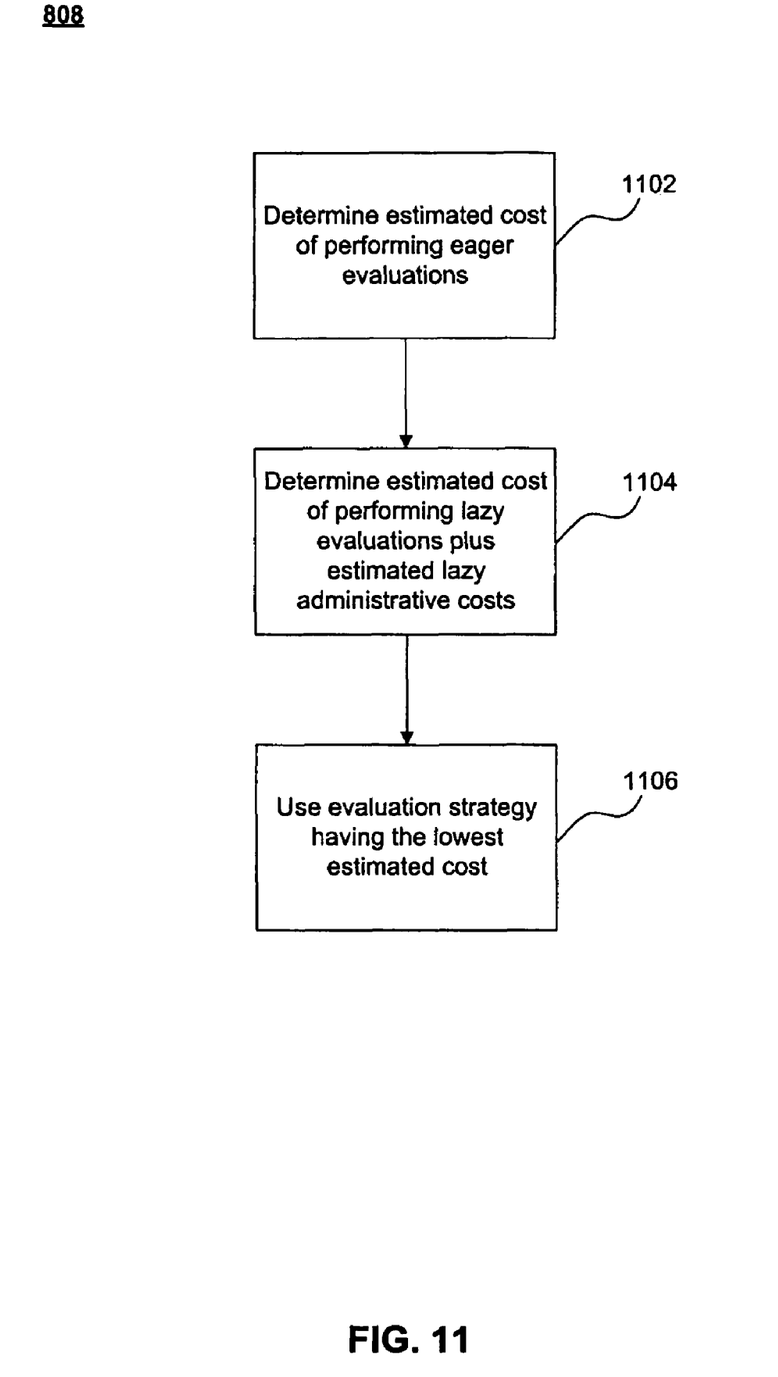
FIG. 11 is a flowchart illustrating a method of evaluating non-strict expressions, according to an embodiment of the invention.

Operation of step 1206 according to an embodiment of the invention shall now be further described with reference to FIG. 11. In step 1102, the cost of evaluating the expression eagerly is estimated. The benefits of using memoization are also estimated. As will be appreciated by persons skilled in the relevant art(s), the DBMS 140 maintains records and statistics on the cost of evaluating functions (i.e., how long functions take to evaluate, resources needed to evaluate functions, etc.). Accordingly, techniques for estimating the cost of performing the expression eagerly using such records and statistics will be apparent to persons skilled in the relevant art(s).

In step 1104, the cost of evaluating the expression using the lazy approach is estimated. The benefits of using memoization are also estimated. This estimate includes the cost of performing lazy evaluations, as well as the administrative costs associated with lazy processing. As will be appreciated by persons skilled in the relevant art(s), the DBMS 140 also maintains records and statistics for the cost of maintaining and processing valid flags (such as flags 304, 306, 308, 310, 312 in FIG. 6) and back links (such as back links 602 and 604 in FIG. 6). Accordingly, techniques for estimating the cost of evaluating the expression lazily using the records and statistics maintained by the DBMS 140 will be apparent to persons skilled in the relevant art(s).

In step 1106, the expression is evaluated lazily if the estimated cost of lazy evaluation is less than the estimated cost of eager evaluation. Otherwise, the expression is evaluated eagerly. Memoization is used if it reduces the expected cost of the QEP.

3. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of evaluating an expression in a database management system, comprising:
   (a) determining whether said expression is strictly needed, wherein said determining step comprises determining if one or more arguments of said expression must be evaluated before said expression itself can be evaluated;
   (b) determining a number of parents of said expression;
   (c) evaluating said expression at an execution location using every argument in said expression, when it is determined that said expression has multiple parents, when said expression is strictly needed; and
   (d) evaluating said expression at most once at an execution location using a subset of arguments in said expression, regardless of whether an evaluation of said expression is needed more than once at said execution location, when it is determined that said expression has a single parent.

2. The method of claim 1, wherein step (a) comprises:
   determining that said expression is strictly needed if one or more of (i) and (ii) is true; and
   determining that said expression is not strictly needed if (i) and (ii) are false;
   wherein (i) and (ii) are defined as follows:
      (i) said expression is strictly needed by an execution location;
      (ii) said expression is reachable by one or more strict edges from a strictly needed expression.

3. The method of claim 1, further comprising:
   determining a first estimated cost of evaluating said expression eagerly;
   determining a second estimated cost of evaluating said expression lazily;
   evaluating said expression eagerly if said first estimated cost is less than said second estimated cost; and
   evaluating said expression lazily if said second estimate cost is less than said first estimated cost.

4. The method of claim 3, wherein said second estimated cost comprises an estimated cost of evaluating said expression, and an estimated administrative cost associated with valid flags and back links.

5. The method of claim 1, wherein said expression is a scalar expression.

6. The method of claim 1, wherein said subset of arguments of said expression are used for evaluating said expression, when it is determined that said expression is true if any one of the arguments in said subset are also true.

7. An article of manufacture including a computer-readable medium having instructions stored thereon that, when executed by a processing device, cause the processing device to perform operations comprising:
   determining whether said expression is strictly needed wherein said determining step comprises determining if one or more arguments of said expression must be evaluated before said expression itself can be evaluated;
   determining a number of parents of said expression;
   evaluating said expression at an execution location using every argument in said expression, when it is determined that said expression has multiple parents, and said expression is strictly needed; and
   evaluating said expression at most once at an execution location using a subset of arguments in said expression, regardless of whether an evaluation of said expression is needed more than once at said execution location, when it is determined that said expression has a single parent.

8. The article of manufacture of claim 7, said operations further comprising
   determining that said expression is strictly needed if one or more of (i) and (ii) is true; and
   determining that said expression is not strictly needed if (i) and (ii) are false;
   wherein (i) and (ii) are defined as follows:
      said expression is strictly needed by an execution location;
      (ii) said expression is reachable by one or more strict edges from a strictly needed expression.

9. The article of manufacture of claim 7, said operations further comprising:
   determining a first estimated cost of evaluating said expression eagerly;
   determining a second estimated cost of evaluating said expression lazily;
   evaluating said expression eagerly if said first estimated cost is less than said second estimated cost; and
   evaluating said expression lazily if said second estimate cost is less than said first estimated cost.

10. The article of manufacture of claim 9, wherein said second estimated cost comprises an estimated cost of evaluating said expression, and an estimated administrative cost associated with valid flags and back links.

11. The article of manufacture of claim 7, wherein said expression is a scalar expression.

12. A compiler that evaluates an expression in a database management system, comprising:
   a first module configured to determine whether said expression is strictly needed, and configured to determine if one or more arguments of said expression must be evaluated before said expression itself can be evaluated;
   a second module configured to determine a number of parents of said expression
   a third module configured to evaluate said expression at an execution location using every argument in said expression, when it is determined that said expression has multiple parents, and said expression is strictly needed; and
   a fourth module configured to evaluate said expression at most once at an execution location using a subset of arguments in said expression, regardless of whether an evaluation of said expression is needed more than once at said execution location, when it is determined that said expression has a single parent.

13. The compiler of claim 12, further comprising:
   a fifth module configured to determine that said expression is strictly needed if one or more of (i) and (ii) is true; and
   a sixth module configured to determine that said expression is not strictly needed if (i) and (ii) are false;
   wherein (i) and (ii) are defined as follows:
      (i) said expression is strictly needed by an execution location;
      (ii) said expression is reachable by one or more strict edges from a strictly needed expression.

14. The compiler of claim 12, further comprising:
   a fifth module configured to determine a first estimated cost of evaluating said expression eagerly;

a sixth module configured to determine a second estimated cost of evaluating said expression lazily;

a seventh module configured to evaluate said expression eagerly if said first estimated cost is less than said second estimated cost; and an eighth module configured to evaluate said expression lazily if said second estimate cost is less than said first estimated cost.

15. The compiler of claim 14, wherein said second estimated cost comprises an estimated cost of evaluating said expression, and an estimated administrative cost associated with valid flags and back links.

16. The compiler of claim 12, wherein said expression is a scalar expression.

\* \* \* \* \*